(12) United States Patent
Yi et al.

(10) Patent No.: US 11,150,496 B2
(45) Date of Patent: Oct. 19, 2021

(54) ADJUSTABLE OPTICAL SWITCH BASED ON PLZST ANTIFERROELECTRIC PHOTONIC CRYSTAL, AND ADJUSTING AND CONTROL METHOD THEREOF

(71) Applicant: HUBEI MINZU UNIVERSITY, Enshi (CN)

(72) Inventors: Jinqiao Yi, Enshi (CN); Li Zhu, Enshi (CN); Jianjun Tan, Enshi (CN); Xianbo Sun, Enshi (CN); Yong Huang, Enshi (CN); Tao Hu, Enshi (CN)

(73) Assignee: HUBEI MINZU UNIVERSITY, Enshi (CN)

( * ) Notice: Subject to any disclaimer, the term of this patent is extended or adjusted under 35 U.S.C. 154(b) by 0 days.

(21) Appl. No.: 17/151,128

(22) Filed: Jan. 16, 2021

(65) Prior Publication Data
US 2021/0223579 A1    Jul. 22, 2021

(30) Foreign Application Priority Data
Jan. 19, 2020 (CN) .......................... 202010059452.2

(51) Int. Cl.
*G02F 1/03* (2006.01)
*G02F 1/055* (2006.01)

(52) U.S. Cl.
CPC .......... *G02F 1/0316* (2013.01); *G02F 1/0551* (2013.01); *G02F 1/0558* (2013.01)

(58) Field of Classification Search
None
See application file for complete search history.

(56) References Cited

U.S. PATENT DOCUMENTS

| 2010/0310208 A1* | 12/2010 | Wang | ...................... G02F 1/035 385/14 |
| 2012/0301075 A1* | 11/2012 | Wang | ...................... B82Y 20/00 385/28 |
| 2013/0016411 A1* | 1/2013 | Liau | ......................... G02F 3/00 359/108 |

* cited by examiner

*Primary Examiner* — Christopher Stanford
*Assistant Examiner* — Journey F Sumlar (57) ABSTRACT

An adjustable optical switch based on a PLZST antiferroelectric photonic crystal, and an adjusting and control method thereof, which belongs to the technical field of micro and nano optoelectronic devices. The adjustable optical switch based on a PLZST antiferroelectric photonic crystal includes an air column type photonic crystal with a diameter of air columns of 420 nm, and a spacing of air columns of 200 nm. According to the present disclosure, a photonic crystal switch is designed by utilizing the coupling property between photonic crystals, and the central wavelength of optical waves is adjusted through the action of the electric field, so that an electro-optical switch with a central wavelength adjustable in a wide range is provided, and has a response speed of less than 1 nanosecond, and the central wavelength can be adjusted in a range of 1100 nm to 1750 nm.

10 Claims, 4 Drawing Sheets

ADJUSTABLE OPTICAL SWITCH BASED ON PLZST ANTIFERROELECTRIC PHOTONIC CRYSTAL, AND ADJUSTING AND CONTROL METHOD THEREOF

CROSS-REFERENCE TO RELATED APPLICATIONS

The application claims priority to Chinese patent application No. 202010059452.2, filed on Jan. 19, 2020, the entire contents of which are incorporated herein by reference.

TECHNICAL FIELD

The present disclosure belongs to the technical field of micro and nano optoelectronic devices, and particularly relates to an adjustable optical switch based on a PLZST (Lead Lathanum Zirconate Stannate Titanate) antiferroelectric photonic crystal, and an adjusting and control method thereof.

BACKGROUND

Currently, the closest prior art is: an optical switch is an optical device which has one or more alternate transmission ports and functions to physically switch or logically operate optical signals in an optical transmission line or integrated optical path. In optical fiber transmission systems, optical switches are used for switching of multiplexed monitors, LANs, multi-light sources, detectors, and protection Ethernet networks. In optical fiber systems, it is used for optical fiber testing, optical fiber device testing and network testing, optical fiber sensing multi-point monitoring, etc.

Optical switches play an important role in optical networks. In WDM transmission systems, optical switches can be used for wavelength adaptation, regeneration and clock extraction. In TDM systems, optical switches can be used for demultiplexing; and in all-optical switching systems, optical switches are the key devices for optical cross-connect and also the important devices for wavelength conversion.

According to the principles of different optical switches, optical switches are implemented in various ways, such as: traditional mechanical optical switches, micromechanical optical switches, thermo-optical switches, liquid crystal optical switches, electro-optical switches, acousto-optical switches, etc. Among others, traditional mechanical optical switches, micro-mechanical optical switches and thermo-optical switches are widely used in different scenarios because of their respective characteristics.

The micro-electro-mechanical optical switch is the fastest developing trend in recent years. It is a new micromechanical-electro-optical integrated switch produced by combining micro and nano processing technology with micro-optics and micro-mechanical technology. It is the main trend of the development of switches for large capacity switch optical networks.

The MEMS (micro-electro-mechanical) optical switch is formed by carving micro-lenses on a silicon crystal, and with the action of electrostatic force or electromagnetic force, the movable micro-lenses can be lifted, rotated or moved, so that the propagation direction of input light is changed so as conduct or cut off the optical path. Compared with other optical switches, the MEMS optical switch has the following obvious advantages: the switching time is generally in the order of ms; the IC manufacturing technology is used, achieving small size with a high level of integration; the working mode is independent of the format, protocol, transmission direction, polarization direction and modulation mode of optical signals, and optical signals with any wavelength can be processed; and the MEMS optical switch has the advantages of mechanical optical switches, such as low insertion loss, low crosstalk, low polarization sensitivity and high extinction ratio, as well as the advantages of waveguide switches, such as high switching speed, small volume and easiness in large-scale integration.

The 8*8 PLZT (Lead Lanthanum Zirconate Titanate) optical switch developed by Epi Photonics, a Japanese optical device developer, has a switching speed of 20 nanoseconds. Applications for nanosecond optical switches include data center interconnect required low delay optical switching, on-demand ROADM and optical cross-connect, SDN optical networks, optical packet switching, optical burst switching, and quantum optics.

In summary, the problems existing in the prior art are as follows: the optical switches manufactured using the MEMS technology is simple in principle and completely compatible with the existing semiconductor technology, but has the main defects of slow switching response speed, complex control signals, large volume and large power consumption; the waveguide optical switches prepared with PLZT and semiconductor materials has the advantages of high speed, small volume and easiness in large-scale integration, but mainly aims at fixed wavelengths and cannot transmit light waves with non-characteristic frequencies.

The difficulty in solving the technical problem is as follows: for the optical switch prepared based on semiconductor material using the MEMS technology, the optical path is changed mainly by electrostatic force or electromagnetic force acting on micro lenses, and due to inertia, it takes a long time from the action of the control force to the response of the micro lenses, so that a breakthrough must be made in principle to improve the response speed. The photonic crystal waveguide type optical switch mainly utilizes the localization of photonic crystal defects to light waves of specific wavelengths to conduct light, and therefore only aims at light waves of specific frequencies, and the only way to adjust the central wavelength is to change the dielectric constant of the photonic crystal base material. However, the commonly used silicon material is indirect bandgap semiconductors, whose dielectric constant cannot be significantly adjusted by applying an external electric or magnetic field. Therefore, silicon-based photonic crystal waveguide optical switches can only be applied to light waves of specific frequencies.

The significance of solving the above technical problems is as follows: the adjustable switch provided by the present disclosure is prepared using a PLZST (Lead Lathanum Zirconate Stannate Titanate) antiferroelectric photonic crystal as base material, which is compatible with the existing silicon semiconductor process, thereby facilitating large-scale integration and allowing wide application due to its compatibility with existing light sources and detection equipment; the dielectric constant of the PLZST antiferroelectric material can be adjusted under the action of a longitudinal electric field, which in turn changes the central wavelength of the PLZST photonic crystal waveguide, so that the PLZST photonic crystal waveguide can be used for switching among light waves with different frequencies, and has unique parameter advantages in the field of frequency division multiplexing communication.

SUMMARY

In order to solve the problems in the prior art, the present disclosure provides an adjustable optical switch based on a PLZST (Lead Lathanum Zirconate Stannate Titanate) antiferroelectric photonic crystal, and an adjusting and control method thereof.

An adjustable optical switch based on a PLZST antiferroelectric photonic crystal, comprising a PLZST antiferroelectric photonic crystal, a PLZST antiferroelectric photonic crystal coupler, switching electrodes, and adjusting and control electrodes, wherein the PLZST antiferroelectric photonic crystal comprises a Si substrate;

the switching electrodes are provided in a region parallel to the PLZST antiferroelectric photonic crystal coupler; and the adjusting and control electrodes are each formed by a Pt film and an alumina ceramic layer on quartz glass and are mounted on upper and lower surfaces of the two-dimensional PLZST antiferroelectric photonic crystal, respectively, and the switching electrodes and the adjusting and control electrodes are connected to a control circuit by means of a probe station.

The adjustable optical switch based on a PLZST antiferroelectric photonic crystal, wherein the PLZST antiferroelectric photonic crystal waveguide is of air column type with a diameter of air columns of 420 nm, and a spacing of air columns of 200 nm; and the switching electrodes have a width of 7 μm.

The adjustable optical switch based on a PLZST antiferroelectric photonic crystal, wherein the PLZST antiferroelectric photonic crystal comprises a photonic crystal waveguide A and a photonic crystal waveguide B;

the photonic crystal waveguide A and the photonic crystal waveguide B both have a length of 50 μm; and the antiferroelectric photonic crystal coupler is a coupler for the photonic crystal waveguide A and the photonic crystal waveguide B, and has a length of 5 μm.

The adjustable optical switch based on a PLZST antiferroelectric photonic crystal, wherein if the photonic crystal waveguide A is connected to an incident light coupler, then the photonic crystal waveguide B is connected to an emergent lighter coupler; and if the photonic crystal waveguide B is connected to an incident light coupler, then the photonic crystal waveguide A is connected to an emergent light coupler.

The adjustable optical switch based on a PLZST antiferroelectric photonic crystal, wherein the switching electrodes are made of metal Pt and prepared by magnetron sputtering in the following specific steps:
(1) designing an electrode pattern;
(2) performing spin-coating in a lithography machine;
(3) performing electron beam explosure;
(4) performing developing and stripping;
(5) performing coupled plasma etching;
(6) depositing a Pt electrode using a magnetron sputtering instrument; and
(7) removing photoresist.

The adjustable optical switch based on a PLZST antiferroelectric photonic crystal, wherein a method for preparing the adjusting and control electrodes comprises the following steps:
(1) cleaning a quartz glass sample plate;
(2) preparing Pt with a thickness of 50-80 nm on the quartz glass sample plate by magnetron sputtering to serve as an electrode, and preparing alumina ceramic with a thickness of 40-50 nm on the surface of the Pt electrode by magnetron sputtering to serve as an insulating layer;
(3) bonding a quartz glass plate with metal Pt and an alumina ceramic layer to the upper surface of the PLZST antiferroelectric photonic crystal by thermocompression bonding, with the alumina ceramic insulating layer directly fitting to the surface of the photonic crystal;
(4) attaching a two-dimensional PLZST antiferroelectric photonic crystal prepared based on an SSO template method to a Si substrate, and chemically etching off the Si substrate;
(5) bonding a quartz glass plate with metal Pt and an alumina ceramic layer to the lower surface of the PLZST antiferroelectric photonic crystal by hot-pressing bonding, with the alumina ceramic insulating layer directly fitting to the surface of the photonic crystal;
(6) connecting an optical path and a circuit; and
(7) applying a direct or reverse bias voltage to an adjusting and control circuit to vary the dielectric constant of PLZST antiferroelectric material so as to change refractive indexes of the PLZST antiferroelectric photonic crystal and the PLZST antiferroelectric photonic crystal coupler, thereby adjusting the central wavelength of the PLZST antiferroelectric photonic crystal.

The adjustable optical switch based on a PLZST antiferroelectric photonic crystal, wherein the connection of the optical path and the circuit in the step (6) comprises:

optical fiber is connected to the PLZST photonic crystal waveguide through a grating to form the optical path; an upper surface of the light path is connected to a positive electrode of the adjusting and control circuit, and a lower surface of the light path is connected to a negative electrode of the adjusting and control circuit; a side of incident light is connected to a positive electrode of the switching electrodes, and a side of emergent light is connected to a negative electrode of the switching electrodes;

the adjusting and control circuit and the switching circuit are both connected to the PLZST antiferroelectric photonic crystal adjustable optical switch by means of the probe station;

the light path is connected to a laser generator and a light intensity detector;

the incident light and the emergent light are connected to optical fiber through a grating coupler; and the on and off state of the optical switch is controlled by the intensity and direction of an electric field applied by the couplers of the photonic crystal waveguide A and the photonic crystal waveguide B.

A central wavelength adjusting and control method for a photonic crystal waveguide of the adjustable optical switch based on a PLZST antiferroelectric photonic crystal, comprising:

(1) a photonic crystal waveguide A is connected to an incident light coupler, a photonic crystal waveguide B is connected to an emergent light coupler, a first switching electrode is connected to a positive electrode of a switching control circuit, and a second switching electrode is connected to a negative electrode of the switching control circuit; a top electrode of the PLZST antiferroelectric photonic crystal is connected to a positive electrode of an adjusting and control circuit, and a bottom electrode of the PLZST antiferroelectric photonic crystal is connected to a negative electrode of the adjusting and control circuit;

(2) when a zero voltage is applied to the switching electrodes and the adjusting and control electrodes, the central wavelength of the photonic crystal waveguide is 1550 nm as default, and 99% of infrared light passes through the optical switch, then the switch is on;

(3) when a voltage of 3V is applied to the switching electrodes, emergent light coming out from the photonic crystal waveguide B of the PLZST antiferroelectric photonic crystal is less than 1%, then the switch is off;

(4) when a positive bias voltage is applied to the adjusting and control circuit, namely a positive voltage is applied to the top electrode and a negative voltage is applied to the bottom electrode, the central wavelength of the PLZST antiferroelectric photonic crystal moves from 1550 nm towards high frequency, and when the electric field intensity is 50 kV/cm, the central wavelength of the PLZST antiferroelectric photonic crystal is 1100 nm; and (5) when a negative bias voltage is applied to the adjusting and control circuit, namely a negative voltage is applied to the top electrode and a positive voltage is applied to the bottom electrode, the central wavelength of the PLZST antiferroelectric photonic crystal moves from 1550 nm towards low frequency, and when the electric field intensity is −50 kV/cm, the central wavelength of the PLZST antiferroelectric photonic crystal is 1750 nm.

A multi-monitor, LAN, multi-light source or detector having an adjustable optical switch based on a PLZST antiferroelectric photonic crystal of.

Uses of the adjustable optical switch based on a PLZST antiferroelectric photonic crystal in optical fiber testing, optical fiber device testing, network testing or optical fiber sensing multi-point monitoring.

In summary, the present application has the following advantages and beneficial effects: on the basis of the PLZST antiferroelectric photonic crystal, a photonic crystal is designed by utilizing the localization property of photonic crystal defects to photons, a photonic crystal switch is designed by utilizing the coupling property between photonic crystals, and the central wavelength of the photonic crystal is adjusted under the action of an electric field, so that an electro-optical switch with a central wavelength adjustable in a wide range is provided, which has a switching voltage of less than 3V and a response speed of less than 1 nanosecond, and the central wavelength can be adjusted in a range of 1100 nm to 1750 nm.

According to the adjustable optical switch based on a PLZST antiferroelectric photonic crystal, incident light enters the photonic crystal waveguide A through grating coupling and comes out from the photonic crystal waveguide B through waveguide coupling, and the coupling efficiency is up to more than 99%.

According to the present disclosure, based on the localization property of the PLZST antiferroelectric photonic crystal waveguide to photons, and based on the fact that the PLZST antiferroelectric material can be significantly changed under the excitation of the electric field in two aspects, i.e. the violent change in the dielectric constant and the abrupt change in the lattice constant, an adjustable optical switch is designed, which, compared with a conventional optical switch, has a lower control voltage, which is less than 3V. The optical switch can be turned on and off by applying electric fields in different directions, and the central wavelength of the photonic crystal waveguide can also be adjusted and controlled by applying an adjustable electric field which is adjusted in a range of 1100 nm to 1750 nm, thereby having wide applications in FITL, automatic measurement, optical fiber network remote monitoring, optical path switching, system monitoring, laboratory research and development, dynamic configuration, frequency division multiplexing, optical path monitoring systems, optical loop protection switching tests, optical fiber sensing systems and optical device testing systems.

Comparison with the Prior Art:

| Items | Conventional | Present disclosure |
| --- | --- | --- |
| Ultrafast switching time | 10 ns | 1 ns |
| Switching drive voltage | 5 V-10 V | 1 V-3 V |
| Operating wavelength | 1550 nm | 1100 nm-1750 nm |
| Adjustability | non-ajustable | adjustable |
| Extinction ratio | 40 dB | 60 dB |
| Current | 230 mA | <1 mA |

DETAILED DESCRIPTION OF THE EMBODIMENTS

In order that the objects, technical solutions, and advantages of the present disclosure will become more apparent, the present disclosure will be described in further detail with reference to embodiments. It is to be understood that the specific embodiments described herein are merely illustrative of the present disclosure and are not intended to be limiting thereof.

The central wavelength of the existing waveguide type optical switch is not adjustable, and is slow in response.

In order to solve the problems in the prior art, the present disclosure provides an adjustable optical switch based on a PLZST (Lead Lathanum Zirconate Stannate Titanate) antiferroelectric photonic crystal, and an adjusting and control method thereof, which will be described in detail below with reference to the drawings.

Figure 1:
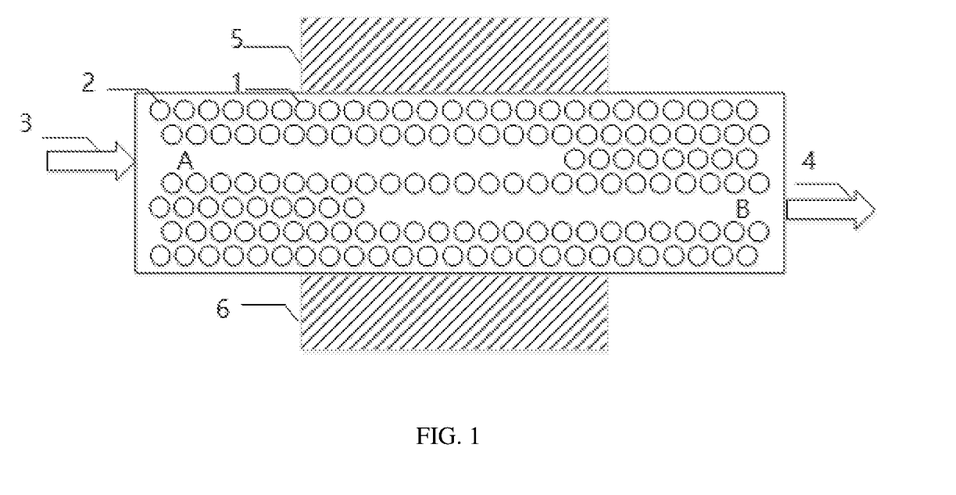
FIG. 1 shows a schematic diagram of an adjustable optical switch based on a PLZST (Lead Lathanum Zirconate Stannate Titanate) antiferroelectric photonic crystal according to an embodiment of the present disclosure.

As shown in FIG. 1, an adjustable optical switch based on a PLZST antiferroelectric photonic crystal according to an embodiment of the present disclosure, includes: an air column type PLZST antiferroelectric photonic crystal 1, an alumina ceramic layer 2, incident light 3, emergent light 4, a first switching electrode 5, and a second switching electrode 6.

The adjustable optical switch based on the PLZST antiferroelectric photonic crystal includes the PLZST antiferroelectric photonic crystal 1, a PLZST antiferroelectric photonic crystal coupler, switching electrodes, and adjusting and control electrodes; and the PLZST antiferroelectric photonic crystal includes a Si substrate.

The switching electrodes are provided in a region parallel to the PLZST antiferroelectric photonic crystal coupler and have a width of 7 μm. The switching electrodes include the first switching electrode 5 and the second switching electrode 6.

The adjusting and control electrodes are each formed by a Pt film and an alumina ceramic layer on quartz glass and are mounted on upper and lower surfaces of the two-dimensional PLZST antiferroelectric photonic crystal, respectively, and the switching electrodes and the adjusting and control electrodes are connected to a control circuit by means of a probe station.

The PLZST antiferroelectric photonic crystal waveguide is of air column type with a diameter of air columns of 420 nm, and a spacing of air columns of 200 nm.

The PLZST antiferroelectric photonic crystal includes a photonic crystal waveguide A and a photonic crystal waveguide B.

The photonic crystal waveguide A and the photonic crystal waveguide B both have a length of 50 μm.

The antiferroelectric photonic crystal coupler is a coupler for the photonic crystal waveguide A and the photonic crystal waveguide B, and has a length of 5 μm.

If the photonic crystal waveguide A is connected to an incident light coupler, then the photonic crystal waveguide B is connected to an emergent light coupler; and if the photonic crystal waveguide B is connected to the incident light coupler, then the photonic crystal waveguide A is connected to the emergent light coupler.

The switching electrodes are made of metal Pt and prepared by magnetron sputtering in the following specific steps:

(1) An electrode pattern is designed.
(2) Spin-coating is performed in a lithography machine.
(3) Electron beam exposure is performed.
(4) Developing and stripping are performed.
(5) Coupled plasma etching is performed.
(6) A Pt electrode is deposited using a magnetron sputtering instrument.
(7) Photoresist is removed.

Figure 2:
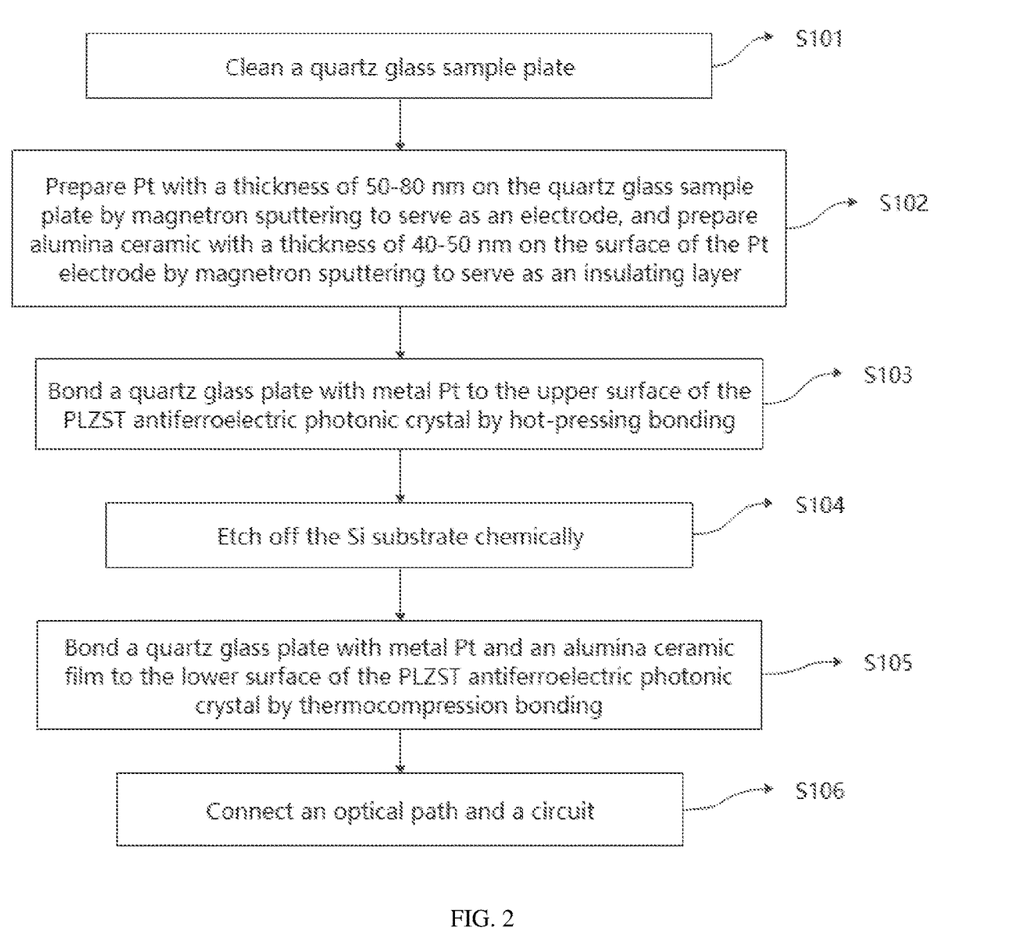
FIG. 2 shows a flow chart of a method for preparing adjusting and control electrodes of the adjustable optical switch based on a PLZST antiferroelectric photonic crystal according to the embodiment of the present disclosure.

As shown in FIG. 2, a method for preparing the adjusting and control electrodes of the adjustable optical switch based on a PLZST antiferroelectric photonic crystal according to the embodiment of the present disclosure, includes the following steps:

S101, a quartz glass sample plate is cleaned.

S102, Pt is prepared with a thickness of 50-80 nm on the quartz glass sample plate by magnetron sputtering to serve as an electrode; and alumina ceramic is prepared with a thickness of 40-50 nm on the surface of the Pt electrode by magnetron sputtering to serve as an insulating layer.

S103, a quartz glass plate with metal Pt and an alumina film is bonded to the upper surface of the PLZST antiferroelectric photonic crystal by thermocompression bonding.

S104, the Si substrate is chemically etched off.

S105, a quartz glass plate with metal Pt is bonded to the lower surface of the PLZST antiferroelectric photonic crystal by hot-pressing bonding.

S106, an optical path and a circuit are connected.

In step S103, the alumina film is an alumina ceramic layer.

After step S106, the method further includes: a direct or reverse bias voltage is applied to an adjusting and control circuit to vary the dielectric constant of the PLZST antiferroelectric material so as to change refractive indexes of the PLZST antiferroelectric photonic crystal and the PLZST antiferroelectric photonic crystal coupler, thereby adjusting the central wavelength of the PLZST antiferroelectric photonic crystal.

In step 106, the connection of the optical path and the circuit in the step (6) includes:

optical fiber is connected to the PLZST photonic crystal waveguide through a grating to form the optical path; an upper surface of the light path is connected to a positive electrode of the adjusting and control circuit, and a lower surface of the light path is connected to a negative electrode of the adjusting and control circuit; the side of the incident light 3 is connected to a positive electrode of the switching electrodes, and the side of the emergent light 4 is connected to a negative electrode of the switching electrodes.

The adjusting and control circuit and the switching circuit are both connected to the PLZST antiferroelectric photonic crystal adjustable optical switch by means of the probe station.

The light path is connected to a laser generator and a light intensity detector.

The incident light and the emergent light are connected to optical fiber through a grating coupler.

The on and off state of the optical switch is controlled by the intensity and direction of an electric field applied by the couplers of the photonic crystal waveguide A and the photonic crystal waveguide B.

Figure 3:
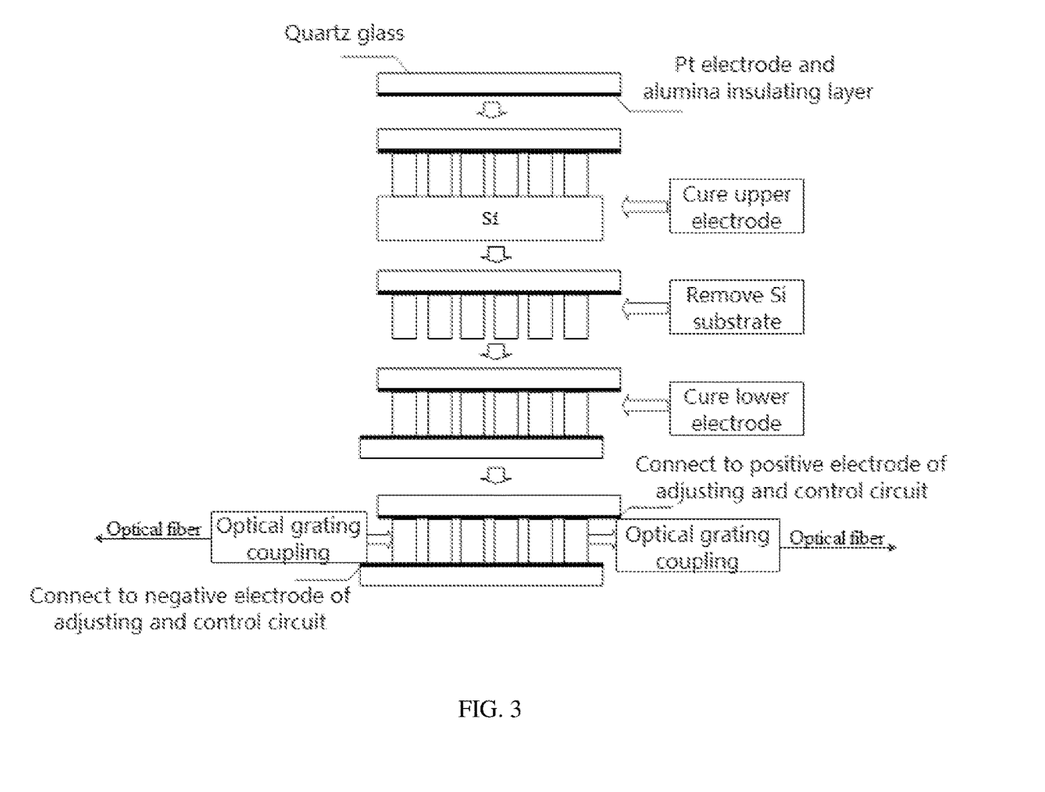
FIG. 3 shows a schematic diagram illustrating an adjusting and control method for the adjustable optical switch based on the PLZST antiferroelectric photonic crystal according to the embodiment of the present disclosure.

FIG. 3 shows a schematic diagram illustrating an adjusting and control method for the adjustable optical switch based on a PLZST antiferroelectric photonic crystal according to the embodiment of the present disclosure.

Assuming that the photonic crystal waveguide A is connected to an incident light coupler, and the photonic crystal waveguide B is connected to an emergent light coupler, then a first switching electrode is connected to a positive electrode of a switching control circuit, and a second switching electrode is connected to a negative electrode of the switching control circuit; a top electrode of the PLZST antiferroelectric photonic crystal is connected to a positive electrode of an adjusting and control circuit, and a bottom electrode of the PLZST antiferroelectric photonic crystal is connected to a negative electrode of the adjusting and control circuit. The first switching electrode 5, the second switching electrode 6 and the photonic crystal are in the same plane.

When no voltage is applied to the switching electrodes and the adjusting and control electrodes, the central wavelength of the photonic crystal waveguide is 1550 nm as default, and is capable of passing through more than 99% of infrared light which enters from the photonic crystal waveguide A and exits from the photonic crystal waveguide B; when a voltage of 3V is applied to the switching electrodes, emergent light coming out from the photonic crystal waveguide B is less than 1%, then it is considered that the switch is turned off.

When a positive bias voltage is applied to the adjusting and control circuit, namely a positive voltage is applied to the top electrode and a negative voltage is applied to the bottom electrode, the central wavelength of the photonic crystal waveguide moves from 1550 nm towards high frequency, and when the electric field intensity is 50 kV/cm, the central wavelength of the PLZST antiferroelectric photonic crystal is 1100 nm.

When a negative bias voltage is applied to the adjusting and control circuit, namely a negative voltage is applied to the top electrode and a positive voltage is applied to the bottom electrode, the central wavelength of the photonic crystal moves from 1550 nm towards low frequency, and when the electric field intensity is −50 kV/cm, the central wavelength of the PLZST antiferroelectric photonic crystal is 1750 nm.

Figure 4:
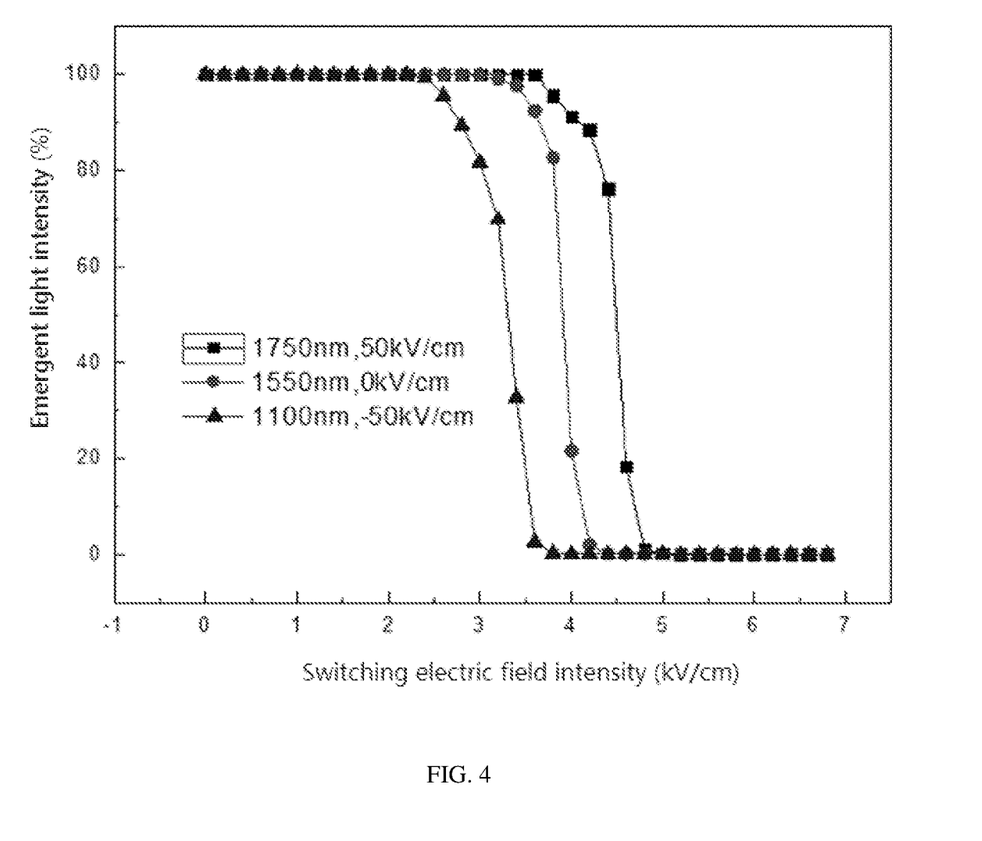
FIG. 4 is a graph showing the corresponding processes that the PLZST antiferroelectric photonic crystal adjustable optical switch according to the embodiment of the present disclosure is turn on and then turn off with the increase of the intensity of a switching electric field when an adjusting and control electric field is −50 kV/cm, 0 kV/cm and 50 kV/cm.

As shown in FIG. 4, when the adjusting and control electric field is −50 kV/cm, 0 kV/cm and 50 kV/cm, the central wavelength of the PLZST antiferroelectric photonic crystal is correspondingly 1100 nm, 1550 nm and 1750 nm, respectively, and the PLZST antiferroelectric photonic crystal is turned off under the action of the switching electric field when the electric field intensity is 3.6 kV/cm, 4.2 kV/cm and 4.8 kV/cm, respectively. The switching response time is less than 1 nm.

What described above are merely preferred embodiments of the present disclosure and are not intended to be limiting thereof, and all modifications, equivalents, and improvements made within the spirit and principles of the present disclosure are intended to be included within the scope of the present invention.

What is claimed is:

1. An adjustable optical switch based on a PLZST antiferroelectric photonic crystal, comprising a PLZST antiferroelectric photonic crystal, the PLZST refers to Lead Lathanum Zirconate Stannate Titanate, a PLZST antiferroelectric photonic crystal coupler, switching electrodes, and adjusting and control electrodes, wherein the PLZST antiferroelectric photonic crystal comprises a Si substrate;

the switching electrodes are provided in a region parallel to the PLZST antiferroelectric photonic crystal coupler; and the adjusting and control electrodes are each formed by a Pt film and an alumina ceramic layer on quartz glass and are mounted on upper and lower surfaces of two-dimensional PLZST antiferroelectric photonic crystal, respectively, and the switching electrodes and the adjusting and control electrodes are connected to a control circuit by means of a probe station.

2. The adjustable optical switch based on the PLZST antiferroelectric photonic crystal of claim 1, wherein a PLZST antiferroelectric photonic crystal waveguide is of air column type with a diameter of air columns of 420 nm, and a spacing of air columns of 200 nm; and the switching electrodes have a width of 7 μm.

3. The adjustable optical switch based on the PLZST antiferroelectric photonic crystal of claim 1, wherein the PLZST antiferroelectric photonic crystal comprises a photonic crystal waveguide A and a photonic crystal waveguide B;

the photonic crystal waveguide A and the photonic crystal waveguide B both have a length of 50 μm; and the antiferroelectric photonic crystal coupler is a coupler for the photonic crystal waveguide A and the photonic crystal waveguide B, and has a length of 5 μm.

4. The adjustable optical switch based on the PLZST antiferroelectric photonic crystal of claim 3, wherein if the photonic crystal waveguide A is connected to an incident light coupler, then the photonic crystal waveguide B is connected to an emergent lighter coupler; and if the photonic crystal waveguide B is connected to an incident light coupler, then the photonic crystal waveguide A is connected to an emergent light coupler.

5. The adjustable optical switch based on the PLZST antiferroelectric photonic crystal of claim 1, wherein the switching electrodes are made of metal Pt and prepared by magnetron sputtering in following specific steps:

(1) designing an electrode pattern;
(2) performing spin-coating in a lithography machine;
(3) performing electron beam explosure;
(4) performing developing and stripping;
(5) performing coupled plasma etching;
(6) depositing a Pt electrode using a magnetron sputtering instrument; and
(7) removing photoresist.

6. The adjustable optical switch based on the PLZST antiferroelectric photonic crystal of claim 1, wherein a method for preparing the adjusting and control electrodes comprises following steps:

(1) cleaning a quartz glass sample plate;
(2) preparing Pt with a thickness of 50-80 nm on the quartz glass sample plate by magnetron sputtering to serve as an electrode, and preparing alumina ceramic with a thickness of 40-50 nm on a surface of the Pt electrode by magnetron sputtering to serve as an insulating layer;
(3) bonding a quartz glass plate with metal Pt and an alumina ceramic layer to the upper surface of the PLZST antiferroelectric photonic crystal by thermocompression bonding, with a alumina ceramic insulating layer directly fitting to a surface of the photonic crystal;
(4) attaching a two-dimensional PLZST antiferroelectric photonic crystal prepared based on an SSO template method to a Si substrate, and chemically etching off the Si substrate;
(5) bonding a quartz glass plate with metal Pt and an alumina ceramic layer to the lower surface of the PLZST antiferroelectric photonic crystal by hot-pressing bonding, with the alumina ceramic insulating layer directly fitting to a surface of the photonic crystal;
(6) connecting an optical path and a circuit.

7. The adjustable optical switch based on the PLZST antiferroelectric photonic crystal of claim 6, wherein a connection of the optical path and the circuit in step (6) comprises:

optical fiber is connected to a PLZST photonic crystal waveguide through a grating to form the optical path; an upper surface of a light path is connected to a positive electrode of the adjusting and control circuit, and a lower surface of the light path is connected to a negative electrode of the adjusting and control circuit; a side of incident light is connected to a positive electrode of the switching electrodes, and a side of emergent light is connected to a negative electrode of the switching electrodes;

the adjusting and control circuit and a switching circuit are both connected to the PLZST antiferroelectric photonic crystal adjustable optical switch by means of the probe station;

the light path is connected to a laser generator and a light intensity detector;

the incident light and the emergent light are connected to optical fiber through a grating coupler; and an on and off state of the optical switch is controlled by intensity and direction of an electric field applied by couplers of the photonic crystal waveguide A and the photonic crystal waveguide B.

8. A central wavelength adjusting and control method for a photonic crystal waveguide of the adjustable optical switch based on a PLZST antiferroelectric photonic crystal of claim 1, comprising:

(1) a photonic crystal waveguide A is connected to an incident light coupler, a photonic crystal waveguide B is connected to an emergent light coupler, a first switching electrode is connected to a positive electrode of a switching control circuit, and a second switching electrode is connected to a negative electrode of the switching control circuit; a top electrode of the PLZST antiferroelectric photonic crystal is connected to a positive electrode of an adjusting and control circuit, and a bottom electrode of the PLZST antiferroelectric photonic crystal is connected to a negative electrode of the adjusting and control circuit;

(2) when a zero voltage is applied to the switching electrodes and the adjusting and control electrodes, the central wavelength of the photonic crystal waveguide is 1550 nm as default, and 99% of infrared light passes through the optical switch, then the switch is on;

(3) when a voltage of 3V is applied to the switching electrodes, emergent light coming out from the photonic crystal waveguide B of the PLZST antiferroelectric photonic crystal is less than 1%, then the switch is off;

(4) when a positive bias voltage is applied to the adjusting and control circuit, namely a positive voltage is applied to the top electrode and a negative voltage is applied to the bottom electrode, the central wavelength of the PLZST antiferroelectric photonic crystal moves from 1550 nm towards high frequency, and when electric field intensity is 50 kV/cm, the central wavelength of the PLZST antiferroelectric photonic crystal is 1100 nm; and (5) when a negative bias voltage is applied to the adjusting and control circuit, namely a negative voltage is applied to the top electrode and a positive voltage is applied to the bottom electrode, the central wavelength of the PLZST antiferroelectric photonic crystal moves from 1550 nm towards low frequency, and when the electric field intensity is −50 kV/cm, the central wavelength of the PLZST antiferroelectric photonic crystal is 1750 nm.

9. The adjustable optical switch based on the PLZST antiferroelectric photonic crystal of claim 1, wherein the adjustable optical switch is mounted in a multi-monitor, LAN, multi-light source or detector.

10. The adjustable optical switch based on the PLZST antiferroelectric photonic crystal of claim 1, wherein the adjustable optical switch is applied in optical fiber testing, optical fiber device testing, network testing or optical fiber sensing multi-point monitoring.

* * * * *